Dec. 16, 1952     F. M. VARNEY ET AL     2,621,581
STEMLESS COFFEE MAKER
Filed May 14, 1948
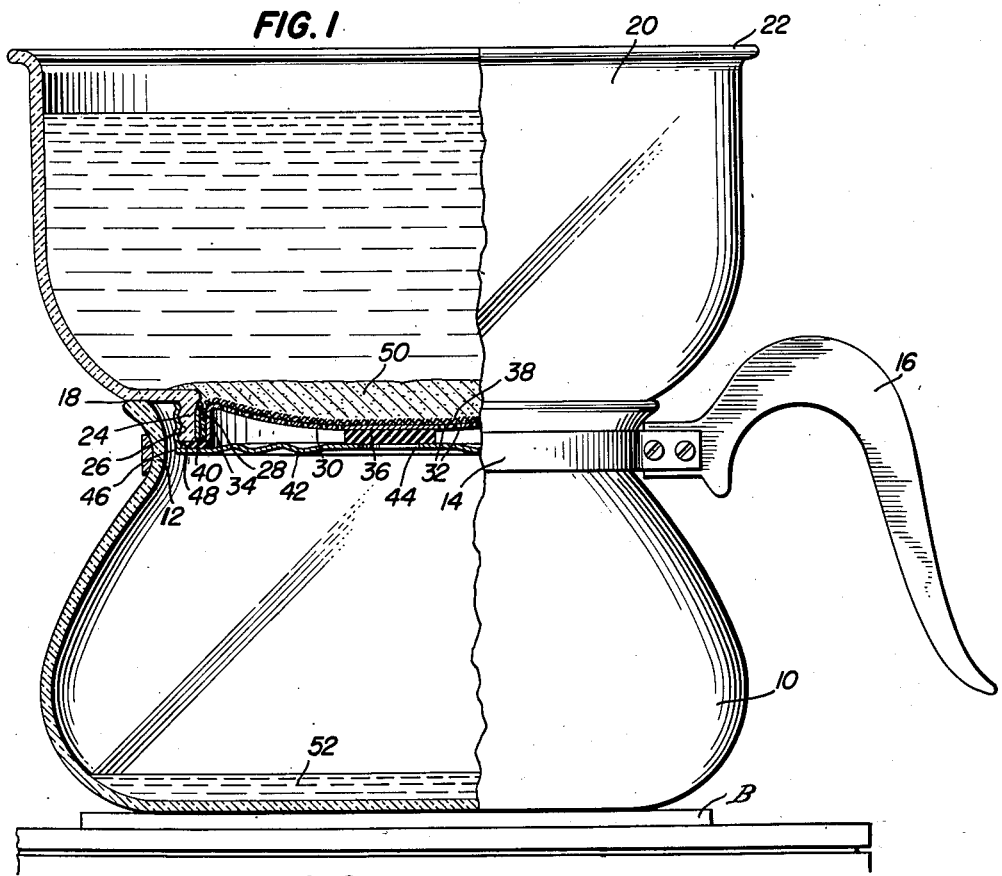
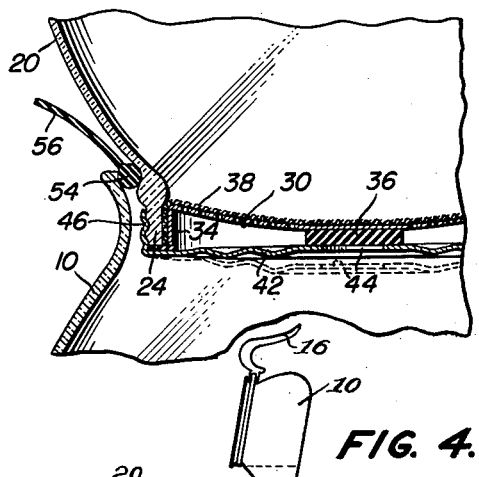
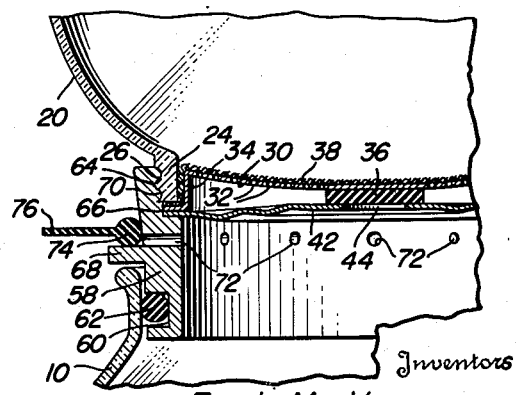
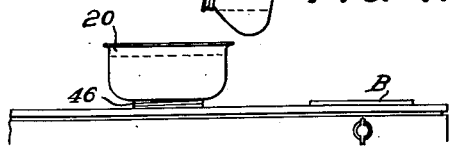
Inventors
Fred M. Varney
Justin Arnold Varney
By
Attorney Patented Dec. 16, 1952

2,621,581

UNITED STATES PATENT OFFICE 2,621,581

STEMLESS COFFEE MAKER

Fred M. Varney, Washington, D. C., and Justin Arnold Varney, Los Angeles, Calif.

Application May 14, 1948, Serial No. 27,068

8 Claims. (Cl. 99—302)

This invention pertains to methods and apparatus for making beverage infusions and has particular reference to improvements in a method and apparatus for making coffee by brewing ground coffee in an upper container and filtering the infusion into a supporting lower vessel under the differential pressure obtained by the condensation of steam in the latter as to distinguish from the method and apparatus shown and described in our Patent No. 2,401,529 of June 4, 1946.

Our invention, therefore, provides novel improvements and refinements in the methods and coffee makers disclosed in the prior patents to Cory No. 2,359,405, dated October 3, 1944, and Schlumbohm No. 2,409,226, dated October 15, 1946, or Loggie et al. No. 1,494,691 dated May 20, 1924. In the Cory type of brewer a ground seating valve arrangement is provided between the upper brewing vessel and the lower boiler and filtrate vessel which permits steam to escape from the lower boiler during the high pressure cycle, and thereafter provides a seal during the low pressure cycle. The same filtering operation is intended in the Schlumbohm and Loggie et al. types of brewers in which a tubular stem is illustrated for handling of the infusion whether mounted on the boiler or not.

In general, the basic problem of preparing satisfactory coffee is the same as described in our former patent, and its solution resides in brewing of coffee grounds at a temperature sufficiently high to fully and quickly release and extract the substances which cause the pleasing aroma and flavor, but without overheating of the brew to such an extent as to release or extract certain oils and constituents which give an unpleasant bitter flavor or taste to the beverage. It is, therefore, essential that the brewing grounds be not heated beyond 203° F. in order to minimize the extraction of these deleterious components. In view of the difficulty of controlling accurately the temperature of the brewing coffee, it has heretofore been exceedingly difficult and an exacting proceeding for the amateur coffee maker, such as the individual housewife, to quickly and with ease and certainty produce completely satisfactory coffee.

Prior to this invention the most acceptable coffee makers have been of the vacuum filtering types, such as are shown in the patents above referred to.

Coffee makers of these types, nevertheless, possess certain inherent disadvantages. In these prior types, when constructed for superimposed arrangement, a depending stem of one kind or another usually extends from the brewing chamber into the lower flask or boiler, which stem renders the handling of the brewing chamber during its use, cleaning and storage, awkward and attended by the danger of breaking both of the obtrusive stem and of the flask.

Further, it has generally been regarded as impossible or impracticable to retain the coffee grounds in contact with all of the infusion throughout the entire period of brewing to insure the maximum extraction of the desirable elements of the coffee beans, it being general practice to maintain a relatively slow and continuous filtering flow from the brewing chamber into the lower chamber.

Moreover, in vacuum coffee makers of the Cory type, the steam generated in the boiler is largely conducted by the communicating stem through the brewing infusion, causing splattering from the open top of the brewer as well as overheating of the infusion.

Still further, it is generally difficult to remove the brewing receptacle from the lower boiler after filtering is completed but while vacuum still persists, both because of the relatively slow trickling of the coffee extract through the filter and the awkwardness of separating the brewer from the boiler and handling and supporting the same apart from the boiler, by reason of the depending stem.

It is, therefore, the primary object of this invention to provide a method and apparatus for making coffee by the vacuum filtering process, which shall overcome the above noted disadvantages hitherto inherent in the manner of coffee making.

A further important object is to provide an apparatus for making coffee by the vacuum filtration process wherein heated air and steam are positively prevented from contact with or excessively raising the temperature of the brewing coffee, the air and steam being exhausted from the boiler flask directly to the atmosphere.

Another important purpose is to provide a vacuum filtration coffee maker wherein the coffee grounds are maintained in continuous contact with all of the infusion, throughout the entire period of brewing before and until rapid and automatic discharge of the infusion through the filter is produced by a vacuum in the lower container from steam condensation therein.

An additional intention of the invention is to provide a vacuum filtration type of coffee maker employing only two cooperating containers, a boiler and a brewing container, the latter being readily handled without leakage during brewing therein and being self-supporting even when filled with the brewing coffee apart from the boiler.

A still further aim of the invention is to provide a coffee maker as set forth hereinbefore provided with automatic pressure responsive means secured to the brewing unit and communicating with the boiler unit for effecting flow of a coffee extract from the brewing unit and into the boiler unit.

Yet another object is to provide a method and apparatus whereby coffee may be easily and automatically brewed and then filtered by unskilled persons with a minimum of attention and labor, which necessitate a minimum of container units and equipment for such automatic operations.

These, together with various ancillary objects and features, which will later become apparent as the following description proceeds, are attained by the invention, of which the accompanying drawings are to be considered as illustrative only, and wherein—

Figure 1 is a side elevational view, parts being broken away and shown in section to disclose structural features of one embodiment of the invention and showing the brewing receptacle seated upon the boiler receptacle for simultaneous operations of brewing coffee in the upper receptacle and generating steam in the lower receptacle to exhaust air therefrom;

Fig. 2 is a fragmentary detail sectional view of a modified construction, the suction operated valve being shown in open position by dotted lines in response to reduction of pressure in the boiler on cooling thereof;

Fig. 3 is a fragmentary detail sectional view of still another modification; and Fig. 4 is a side elevational view on a substantially reduced scale, showing the upper receptacle in its initial supported position receiving boiled water from the lower receptacle prior to assuming the assembled position of Fig. 1.

Referring now more specifically to the annexed drawings, wherein like numerals designate similar parts through the various views, attention is directed first to the embodiment of Fig. 1, wherein the improved coffee maker consists of a lower filtrate receiving container and boiler 10, in the form of a vitreous flask or beaker having an annularly grooved or reduced neck portion 12 for the reception of a supporting strap or clamp 14 and a handle 16.

As thus far described the boiler unit 10 may be of conventional and known construction. However, at its upper edge the flask is formed with a ground glass surface 18 which is similar to the corresponding part in the Cory patent referred to and comprising the valve seat opening to the atmosphere, as set forth hereinafter.

The upper unit or brewer comprises preferably a vitreous container 20 having an outwardly flaring upper open end or rim 22 and an open diametrically reduced dependingly flanged lower end 24. This lower end is externally threaded as at 26 and it is provided internally with an inturned annular edge 28. The lower exterior surface of the brewer bowl 20 may have an annular portion which is ground to form a valve member complementary to and seating upon the valve seat 18.

An automatic valved closure and filter assembly is secured over the lower flanged end 24 of the upper unit 20. This assembly includes a downwardly dished filter element supporting plate 30 which is apertured at 32 and has a down-turned peripheral flange 34. Suitably secured to and depending axially from the perforated plate 30 is a disc-shaped block 36 of rubber or of other suitable sealing material constituting a fixed valve member. Overlying the plate 30 and its flange 34 is a filter element 38 of fiber glass or any other suitable liquid filtering material, which is secured to the flange 34 by means of an annular retaining hoop or ring 40.

A resilient metallic valve plate 42 constitutes the other or movable valve member of the assembly and serves both as a ported valve seat, (see dotted line position in Fig. 2), and as a positive closure for the filter and lower flanged end of the brewing bowl 20. This valve plate 42 has a relatively large axial valve or discharge port 44 adapted to be normally seated upon the disc-shaped sealing block 36, to close the port 44 under spring tension in the plate 42. The plate 42 is supported from its periphery by a rim or flange 46 detachably engaged with the threads 26.

A ring-like gasket 48 is interposed between the plate 42 and the flange 24, ring 40, glass fibre filter 38 and filter plate flange 34 to establish a fluid tight seal at their juncture. It will be noted that the annular concave surface provided by the inturned edge 28 serves to bend the upper edge of the retainer ring 40 radially inwards to tightly compress and grip the filter when the ring is forced upwardly by the valve plate 42 being screwed upon the flange 24.

The disc-like body portion of the valve plate 42 is preferably of a resilient nature, being provided, if desired, with an annularly corrugated surface, and comprises a sheet metal or other diaphragm which is given a bias or "set" normally resiliently urging the central portion of the body upward so as to close the port 44 against the stationary valve body or block 36. The dotted lines show, in Fig. 2, the valve plate and port 44 in the "open" position. This valve plate may, if desired, be made in the form of a biased spring diaphragm, which, when moved or urged downwards past dead center, will cause the movable port 44 to be quickly uncovered and fully opened by moving away from the elastic valve block 36 with a snap-action.

An important feature of the invention is that the construction of the brewing bowl and filter assembly permits of resting the bowl conveniently either on or off the boiler 10 without any special support, whereby the bowl may be easily removed from the boiler 10 and set aside from filling with a coffee infusion without danger of leakage of its contents, as shown in Fig. 4.

The operation of this embodiment is as follows: With the closure unit in closed position on the bottom flange of the brewer 20 a quantity of ground coffee is placed upon the filter element 38. A quantity of water may then be placed in the flask 10 and with or without the brewer 20 seated thereon is brought to a boil on a burner B. This hot water may then be poured into the brewer unit 20 upon the ground coffee therein, and during this operation the brewer may conveniently rest on the marginal portion of the valve plate 42 upon any desired supporting surface for the brewing operation. This operation is illustrated in Fig. 4. A small quantity of water, such as is indicated at 52, in Fig. 1, is either retained or placed in the boiler 10, as is also indicated in Fig. 4, and the upper or brewer unit 20 is then seated thereon, the exterior surface of the upper unit 20, at the ground joint 18, forming a valved closure for the boiler, as shown in Fig. 1.

As the water boils, the steam generated escapes directly to the atmosphere by lifting the unit 20 from its valve seat 18. It will be noted that the boiling serves to maintain the coffee infusion in the brewer 20 in the desired heated condition. When sufficient steam has been generated to expel the air from the boiler the assembled units may be removed from the heating means and allowed to cool whereupon the condensing steam in the boiler will create a vacuum therein, since the ground joint valve seating engagement at 18 will effectively prevent return flow of air to the boiler through the valve member 18. This lowering of pressure within the boiler 10 will eventually pull the center portion of the valve plate 42 downward to its opened position away from the elastic sealing block 36, as shown in dotted lines in Fig. 2, whereupon the pressure difference above and below the coffee infusion causes a rapid flow of the latter through the filter into the boiler flask 10.

The modification of Fig. 2 is similar to that of Fig. 1, in that the boiler 10 detachably supports a brewer unit thereon, which brewer unit may have the same closure plate, valve and filter assembly as is shown in Fig. 1. However, the filter retaining hoop or sleeve may be omitted, whereby the filter is directly clamped between the flange 34 of the filter plate 30 and the annular flange 24 of the upper unit 20 by means of the threaded retaining flange 46 of the valve plate 42. As shown, the same valve block construction 36 and valve port 44 are employed, the valve and the coffee maker operating in the manner described in connection with Fig. 1.

However, instead of a ground joint valve seat being employed as the non-return steam escape valve between the brewer and boiler units 20 and 10, respectively, as in the preceding embodiment, a rubber or other suitable gasket or ring 54 is seated compressively in a groove on the outer surface of the juncture between the flange 24 and boiler unit 20 for establishing sealing engagement with the inner supporting surface of the mouth of the boiler flask 10. An integral tab 56 may be formed on or attached to the ring 54 to facilitate withdrawal of the latter for breaking this sealing engagement as desired.

In the modification of Fig. 3 there is provided the same form of boiler 10 and brewer unit 20, the latter having a depending flange 24 externally threaded as at 26. However, a valve body is shown mounted on the unit 10, forming an insert between brewer and boiler. This valve body consists of a tubular sleeve 58 of suitable shape and material, having an external annular groove 60, provided with a rubber sealing ring 62 for establishing a resilient sealing engagement with the boiler flask 10, and having an internally threaded bore 64 for attachment to the screw threads 26 of the brewer flange 24. In this construction the rim of the valve plate 42 and the outwardly turned rim 66 of the flange 34 of the filter plate 30, together with the rim of the filter 38 are clamped between the opposed ends of the bore 64 and the flange 24. As in the preceding forms, a stationary valve block 36 carried by the filter plate 30 cooperates with a valve port 44 in the resilient, flexible valve plate 42. The operation of the valve 36 and valve plate 42 is identical with those of the foregoing modifications. However, an improved variation in the steam non-return valve is utilized.

An annular shoulder or flange 68 extends from a tapered upwardly and outwardly inclined conical surface 70 on the outer surface of the valve body 58. Radial bores 72 extend through the body 58, communicating with the atmosphere just above the shoulder 68 to form steam escape vents for the boiler 10. A non-return valve comprising an elastic ring 74 of rubber or the like, having a finger grip tab 76, embraces the surface 70 and by reason of the taper of the surface and its own resilience, is biased to a position resting on the shoulder 68 and closing the ports 72. As in the embodiment of Fig. 2, the steam forces its way past the non-return valve ring, escaping directly to the atmosphere.

In both Figs. 2 and 3, after the vacuum operated valve plate 42 has been actuated and the coffee infusion filtered and discharged, the valve valve members 36 and 44 are finally closed. During the period in which vacuum has existed in boiler 10 the non-return valve rings have sealed tightly, and the filtered coffee is thus sealed from the atmosphere, and by reason of its filtered and sealed condition may be stored for as many as fifteen hours without loss of flavor and aroma. To release this seal when it is desired to dispense coffee, the tabs 56 and 76 are pulled, disengaging the sealing rings 54 and 74, whereupon the upper unit 20 may be easily removed. It will be noted that the tapered conical surface always causes the sealing ring 74 to return to its valve closing position. In both Figs. 2 and 3 a filter retaining hoop or sleeve for securing the filter to the filter plate flange, similar to the sleeve 40 in Fig. 1, may be employed if desired.

It will be seen that by the method and apparatus disclosed herein the operator can readily and with certainty control the actual duration of the brewing period of all of the infusion which has been continuously exposed to all of the grounds; and may thereafter filter and discharge the infusion with great rapidity. Moreover, this has been effected by a minimum of containers or receptacles and equipment to be handled during the coffee making and subsequent operations, and without exposing the infusion to the steam boiled from the lower unit. Further, the automatic valve assembly and filter are unobtrusively and compactly mounted, but yet are easily accessible for servicing and cleansing.

From the foregoing, the manner of constructing the device and its method of operation will be readily understood, and further explanation is deemed to be unnecessary. Since various changes will readily occur to those skilled in this art, the invention is not to be limited to the foregoing description and annexed drawings, but all suitable modifications and variations may be resorted to falling within the scope of the appended claims.

We claim:

1. In a coffee maker, an open top steam generating boiler receptacle, a brewing receptacle having top and bottom open ends, said brewing receptacle seated adjacent its lower end upon said boiler receptacle and normally closing the open top of said boiler receptacle, a partition extending entirely across said lower end of the brewing receptacle and precluding passage of fluid from the boiler receptacle into the brewing receptacle, a steam escape valve disposed between said receptacles and externally of said brewing receptacle, and a spring biased valve in said partition operable by atmospheric pressure upon cooling and subsequent reduction of pressure in the boiler receptacle after the escape of steam therefrom through said first valve for rapidly admitting brewed coffee through said second valve from said brewing receptacle and into said boiler receptacle.

2. The structure according to claim 1 wherein said brewing receptacle includes a cylindrical neck at its lower open end, and said partition includes an apertured filter element supporting plate disposed within said neck, and said differential pressure operated valve includes a fixed valve member secured to said plate and a movable valve member in the form of a resilient metallic plate having a port therein normally closed by said fixed valve member and the margin of said valve plate being secured to said neck.

3. The structure according to claim 2, wherein said brewing receptacle includes a cylindrical neck at its lower open end, said partition including a downwardly dished apertured filter element supporting plate disposed within said neck, a downwardly directed cylindrical flange at the margin of said plate terminating substantially at the free end of said neck, a fiber glass filter element supported on said apertured plate and having a downwardly turned peripheral portion disposed between said neck and said flange, and said differential pressure operated valve comprising a yieldable block fixed to and depending from the center of said plate and a resilient metallic plate normally engaging said block and having its margin disposed beneath and fixed to said neck and having a port therein disposed beneath said block.

4. The structure according to claim 3, wherein said resilient metallic plate is provided with a marginal upwardly directed flange having screw threaded connection with the outer wall of said neck, and the lower face of the resilient plate being normally in a plane and providing a seating surface for the brewing receptacle.

5. The structure according to claim 3, together with a gasket disposed between said resilient plate and the lower ends of said neck and downwardly turned peripheral portion of the filter element.

6. The structure according to claim 4, together with an inwardly directed wedging shoulder on said brewing receptacle adjacent the upper end of said neck, a filter element retaining ring engaged with the outer face of the downwardly turned peripheral portion of the filter element and with the inner wall of the neck and having its upper edge adjacent said shoulder and its lower edge immediately above said resilient plate, whereby such edge is forced by said shoulder in tight clamping engagement with said filter element upon screw threading of said metallic plate flange onto said neck.

7. The structure according to claim 1, wherein said steam escape valve comprises a tubular member having one end thereof removably connected to the lower end of the brewing receptacle and the other end thereof sealingly engaged within the open top of the boiler receptacle, a circumferential series of ports in said tubular member between the top of the boiler receptacle and the bottom of the brewing receptacle and a resilient sealing ring encircling the tubular member and normally closing said ports.

8. In a coffee maker, an open top steam generating boiler receptacle, a brewing receptacle having top and bottom open ends, said brewing receptacle seated adjacent its lower end upon said boiler receptacle and normally closing the open top of said boiler receptacle, a coffee grounds supporting filter extending across the brewing receptacle adjacent the bottom end thereof, a brew supporting partition adjacent the filter element and extending across the bottom open end of said brewing receptacle and normally closing the same and precluding passage of fluid to or from the brewing receptacle, a steam escape valve disposed between said receptacles and externally of said brewing receptacle, said partition comprising a valve, spring means operative in excess of the pressure of the brew in the brewing receptacle acting on said valve to normally bias said valve to closed position and preclude flow of coffee infusion through said partition under conditions of atmospheric pressure thereon, whereby coffee may be brewed in said brewing receptacle apart from said boiler receptacle and thereafter the biasing urge of said valve spring means may be overcome by subatmospheric pressure in the boiler receptacle after the escape of steam therefrom through said first valve and upon subsequent condensation of steam in said boiler receptacle to rapidly draw brewed coffee through said second valve from said brewing receptacle and into said boiler receptacle.

FRED M. VARNEY.
JUSTIN ARNOLD VARNEY.

REFERENCES CITED

The following references are of record in the file of this patent:

UNITED STATES PATENTS

| Number | Name | Date |
| --- | --- | --- |
| 124,579 | Hutchinson | Mar. 12, 1872 |
| 1,489,893 | Malcamp | Apr. 8, 1924 |
| 1,494,691 | Loggie et al. | May 20, 1924 |
| 1,593,101 | Reese | July 20, 1926 |
| 1,674,857 | Emerson | June 26, 1928 |
| 1,762,209 | Aborn | June 10, 1930 |
| 1,830,000 | Miller et al. | Nov. 3, 1931 |
| 2,211,414 | Francis | Aug. 13, 1940 |
| 2,289,497 | Hons, Jr. | July 14, 1942 |
| 2,314,018 | Sanderson | Mar. 16, 1943 |
| 2,359,405 | Cory | Oct. 3, 1944 |
| 2,409,226 | Schlumbohm | Oct. 15, 1946 |

FOREIGN PATENTS

| Number | Country | Date |
| --- | --- | --- |
| 276,959 | Germany | July 23, 1914 |
| 363,181 | France | Apr. 26, 1906 |